United States Patent [19]

Kato

[11] Patent Number: 5,081,887
[45] Date of Patent: Jan. 21, 1992

[54] SYSTEM AND METHOD FOR CONTROLLING VEHICLE SPEED TO PREVENT GEAR SHIFT SHOCK APPLICABLE TO AUTOMATIC TRANSMISSION EQUIPPED VEHICLES

[75] Inventor: Yuji Kato, Kanagawa, Japan

[73] Assignee: Nissan Motor Company, Ltd., Yokohama, Japan

[21] Appl. No.: 538,047

[22] Filed: Jun. 13, 1990

[30] Foreign Application Priority Data

Jun. 13, 1989 [JP] Japan ................................. 1-149872

[51] Int. Cl.⁵ .............................................. B60K 41/10
[52] U.S. Cl. .................................... 74/866; 364/424.1
[58] Field of Search ................. 74/857, 858, 859, 866; 364/424.1

[56] References Cited

U.S. PATENT DOCUMENTS

| | | | |
|---|---|---|---|
| 3,025,718 | 3/1962 | Christenson | 74/858 |
| 3,327,553 | 6/1967 | Peras | 74/858 |
| 4,355,550 | 10/1982 | Will et al. | 74/858 X |
| 4,744,031 | 5/1988 | Takeda et al. | 74/866 X |
| 4,770,064 | 9/1988 | Kuerschner | 74/858 |
| 4,815,340 | 3/1989 | Iwatsuki et al. | 74/858 |
| 4,841,447 | 6/1989 | Hayashi et al. | 364/424.1 X |
| 4,933,851 | 6/1990 | Ito et al. | 74/857 X |

FOREIGN PATENT DOCUMENTS

| | | |
|---|---|---|
| 0163952 | 12/1985 | European Pat. Off. . |
| 0174749 | 10/1983 | Japan .................... 74/858 |
| 61-101622 | 9/1986 | Japan . |
| 62-62047 | 3/1987 | Japan . |
| 62-186013 | 1/1988 | Japan . |
| 63-71530 | 3/1988 | Japan . |
| 62-221934 | 3/1988 | Japan . |
| 2151727 | 7/1985 | United Kingdom .................. 74/858 |

OTHER PUBLICATIONS

EOP-Communication forwarding the European Search Report completed in Berlin, by Examiner P. Krieger on May 16, 1991, citing 7 documents all of which are included herein.

Primary Examiner—Allan D. Herrmann
Assistant Examiner—William O. Trousdell
Attorney, Agent, or Firm—Pennie & Edmonds

[57] ABSTRACT

A system and method for controlling a vehicle speed so as to prevent gear shift shock in a power train associated with a vehicular engine and automatic transmission are disclosed in which an air charging efficiency for engine cylinders is reduced during the gear shifting transient period, e.g., when shifting from first gear range to a higher second gear range. Therefore, when engine output is reduced by means of retardation of ignition timing at the time of gear shifting, no misfire occurs due to prevention of internal pressure increase in any engine cylinder. Thus, shift shock can be prevented with the smooth reduction of engine output and air charging efficiency is smoothly recovered after completion of the gear shift transient period.

13 Claims, 3 Drawing Sheets

SYSTEM AND METHOD FOR CONTROLLING VEHICLE SPEED TO PREVENT GEAR SHIFT SHOCK APPLICABLE TO AUTOMATIC TRANSMISSION EQUIPPED VEHICLES

BACKGROUND OF THE INVENTION

(1) Field of the Invention

The present invention relates to a system and a method for controlling vehicle speed applicable to automatic transmission equipped vehicles in which output of an engine having a turbo charger is transmitted to a driven wheel via an automatic transmission.

The present invention particularly relates to a system and a method for controlling vehicle speed in which gear shifting control is carried out using switching pressure generated by means of on-and-off action of a plurality of solenoid valves.

(2) Background of the Art

In general, automatic transmissions mounted in vehicles include a combination of coupled toothed gear components including a plurality of pairs of planetary gears so that several stages of gear range changes may be carried out by hydraulically operated frictional elements.

A Japanese Patent Application First publication No. Tokkai Showa 62-62047 published on Mar. 18, 1987 exemplifies a shock reduced automatic transmission in which a working fluid pressure for engaging and releasing each frictional element is controlled by means of two shift valves. The change in the shift valves is carried out by means of a change pressure generated by on-and-off action of a solenoid valve, a so called shift solenoid installed corresponding to the shift valves.

An system for carrying out shift valve switching using solenoid valves has been applied to an RE4R01A type automatic transmission, described in "NISSAN FULL RANGE ELECTRONIC CONTROL AUTOMATIC TRANSMISSION", a service manual published in 1987.

On and off control of the shift solenoids can finely control the change shift valve pressure. For example, at a transient time of gear shift change in which the gear position is shifted from the first range to the second range, timing control is carried out such that one of the shift valves is changed from on to off within a short period of time, a rise in the engaged pressure of the frictional elements is gradually carried out. Thus, a reduction of the gear range shock can be achieved.

In addition, to reduce shock generated during a transient period of gear change, the engine output is reduced so that speed control of the vehicle is desirably carried out. This is exemplified by a Japanese Patent Application First publication Showa 63-71530 published on Mar. 31, 1983.

To reduce engine output, the ignition timing can normally be retarded as described in the Japanese Patent Application First Publication No. Showa 63-71530.

However, in previously proposed running speed controlling systems and methods, when internal cylinder pressure is increased with the ignition timing being retarded at the transient time of gear change, mis-firing occurs and engine operation becomes erratic. Conversely, if cylinder pressure is reduced, vibration at the time of gear change becomes great. Even though required secondary voltage may be reduced, an ignition device for igniting a mixture fuel supplied to the engine is large and costly.

SUMMARY OF THE INVENTION

It is an object of the present invention to provide a system and a method for controlling a vehicle speed in which the change in the frictional elements at the time of the gear range change is carried out, the engine output control at the transient time of the gear range change is smoothly carried out, together with a timing control through an on-and-off of the solenoid valves.

The above-described object can be achieved by providing a system for controlling a vehicle speed for an automatic transmission equipped vehicle, the automatic transmission including: (a) a plurality of frictional elements, combinations of engagements and releases thereof causing shifts of gear speed range; (b) a plurality of shift valves which respectively engage and release the frictional elements so that the gear speed range is shifted; (c) a plurality of solenoid valves installed individually on the respective shift valves for controlling a change pressure of the shift valves associated therewith, at least one of the solenoid valves being switched on at a time of a gear range shifting transient period in response to a drive signal; and (d) first means for detecting vehicle running conditions and providing the drive signal according to the detected running conditions, a vehicular engine associated with the automatic transmission including: (e) second means for varying intake air quantity supplied to the engine, air charging efficiency being controlled via the second means, and the system including: (f) third means for setting the air charging efficiency through the second means to a relatively lower value at a time of a gear range shifting transient period from a relatively low speed range to a relatively high speed range; (g) fourth means for detecting a point of time at which the automatic transmission shifts the gear range; (h) fifth means for providing a predetermined time delay upon detection of the point of time at which the automatic transmission shifts the gear range from a low speed range to a high speed range by the fourth means and, for providing a signal indicative thereof; and (i) sixth means for recovering and increasing the air charging efficiency in response to the signal derived by the fifth means.

The above-described object can also be achieved by providing a method for controlling a vehicle speed so as to prevent shift shock from occurring in a power train assocated with a vehicular engine and automatic transmission, the automatic transmission including: (a) a plurality of frictional elements, combinations of engagements and releases thereof causing switchings of gear ratios; (b) a plurality of shift valves which respectively engage and release the frictional elements; (c) a plurality of solenoid valves installed individually on the respective shift valves for controlling a change pressure of the shift valve associated therewith, at least one of the solenoid valves being switched on in response to a drive signal at a gear shifting transient time; and (d) first means for detecting vehicle running conditions and providing the drive signal according to the detected vehicle running conditions, a vehicular engine associated with the automatic transmission including: (e) second means for varying intake air quantity supplied to the engine, air charging efficiency being controlled via the second means, and the method comprising the steps of: (f) setting the air charging efficiency to a relatively lower value at a gear shifting transient time from a relatively low speed range to a relatively high speed range; (g) detecting a point of time at which the automatic transmission shifts the gear range; (h) providing a predetermined time delay for detecting, in the step (g), the point of time at which the automatic transmission shifts the gear range from the low speed range to the high speed range and providing a signal indicative thereof; and (i) recovering and increasing the air charging efficiency in response to the signal derived in the step (h).

DETAILED DESCRIPTION OF THE PREFERRED EMBODIMENTS

Reference will hereinafter be made to the drawings in order to facilitate a better understanding of the present invention.

Figure 1:
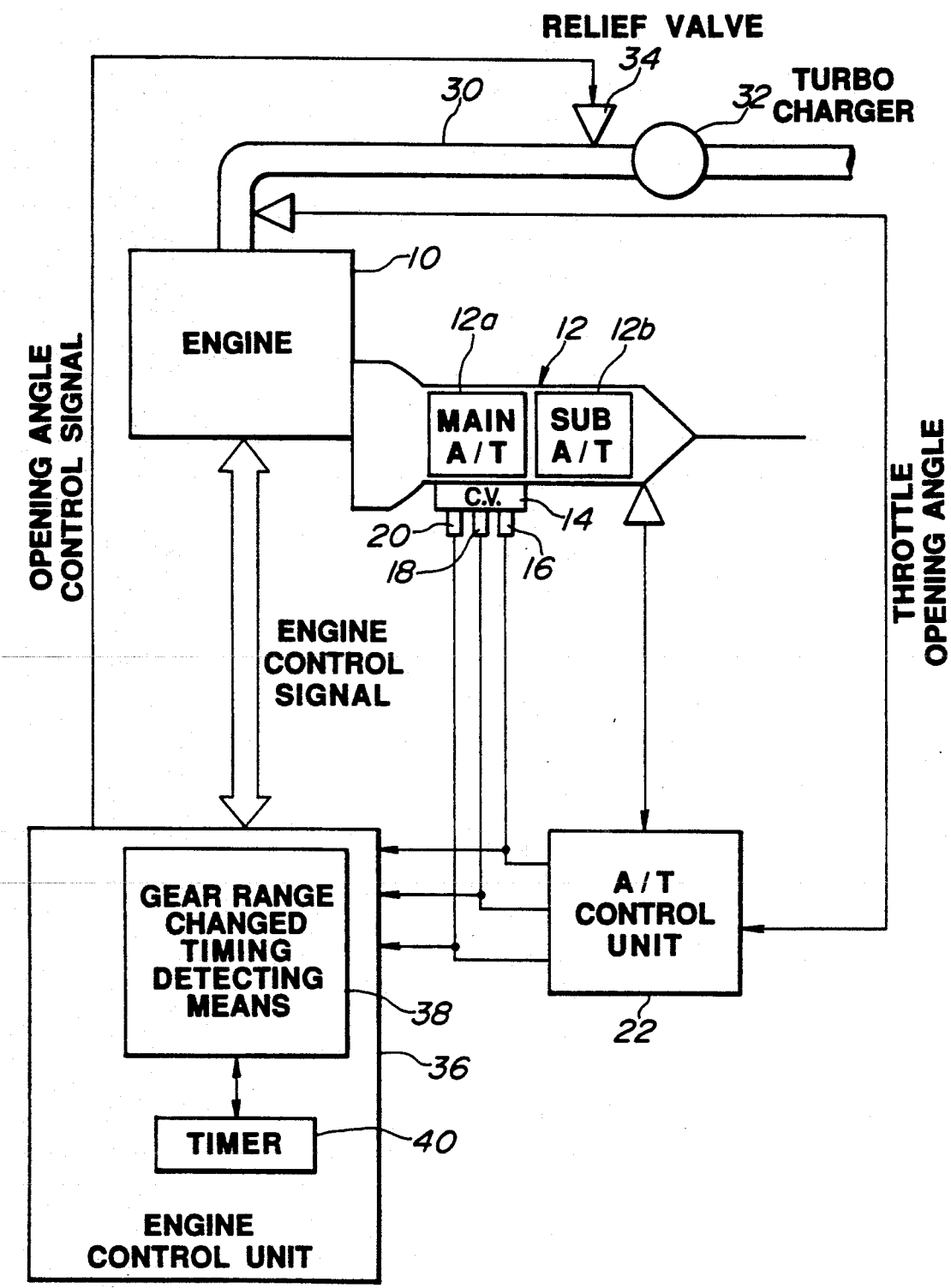
FIG. 1 is a simplified block circuit diagram of a vehicle speed controlling system in a preferred embodiment according to the present invention.

FIG. 1 shows a preferred embodiment of a vehicle speed controlling system according to the present invention.

In FIG. 1, an engine 10 provides an output revolutional speed for an automatic transmission via a torque converter (not shown). The automatic transmission 12 properly changes gear range according to engine revolutions and transmits driving force to driven wheels (not shown).

The automatic transmission 12 includes a main transmission 12a which carries out gear range shifting of 4 forward speeds and a subtransmission 12b which switches between a speed increase position and a constant speed position, both main transmission 12a and subtransmission 12b being arranged in series with each other. Then, the combination of the four stages of the main transmission 12a and the additional speed increase stage of the subtransmission 12b results in a five stage shift range in the forward direction as shown in the following table I.

TABLE I

| Whole shift R | Main Tr 12a | Sub Tr 12b |
| --- | --- | --- |
| 1st R | 1st R | Constant |
| 2nd R | 2nd R | Constant |
| 3rd R | 3rd R | Constant |
| 4th R | 3rd R | Increase |
| 5th R | 4th R | Increase |

The main transmission 12a and sub transmission 12b have power trains, respectively including a plurality of frictional elements such as clutches and brakes which engage or disengage (release) so that a changing of each gear speed range may be carried out. The engagement and disengagement of respective frictional elements is then carried out by means of a controlled fluid pressure supplied from a control valve (C.V.) 14 installed in the automatic transmission 12.

That is to say, the above-described control valve 14 includes first and second shift valves for changing the main transmission 12a, and a third shift valve for changing the subtransmission 12b (all of the first, second, and third shift valves are omitted in FIG. 1). The change-over of the first, second, and third shift valves due to a change in pressure allows the controlled fluid pressure to be supplied to or removed from respective frictional elements.

It is noted that the structure of the main transmission 12a is conventional as exemplified in Japanese Patent Application First Publication (Unexamined) No. showa 62-62047 published on Mar. 18, 1987, the disclosure of which is hereby incorporated by reference.

It is also noted that the automatic transmission disclosed in the Japanese Patent Application First publication No. Showa 62-62047 is coupled with the sub transmission 12b having a two-stage change capability so as to constitute the automatic transmission 12 of the preferred embodiment.

The first, second, and third shift valves include a first, second, and third solenoids 16, 18, and 20, respectively (each solenoid 16, 18, and 20 being an offdrain type). When a drive signal transmitted from an A/T (automatic transmission) control unit 22 is caused to energize (turn on) any one of the first, second, and third solenoids 16, 18, and 20, a change pressure in the corresponding shift valve is generated.

It is noted that the drive signal for each shift solenoid 16, 18, and 20 is derived from the A/T control unit 22 and is determined on the basis of such vehicle running conditions as opening angle of the throttle valve, vehicle speed, and so forth.

The first, second, and third shift solenoids 16, 18, and 20 are controlled in an on-and-off mode so as to achieve each gear speed range shown in Table I, as appreciated from the following Table II.

TABLE II

| gear speed range | 1st shift solenoid | 2nd shift solenoid | 3rd shift solenoid |
| --- | --- | --- | --- |
| 1st R | ON | ON | ON |
| 2nd R | OFF | ON | ON |
| 3rd R | OFF | OFF | ON |
| 4th R | OFF | OFF | OFF |
| 5th R | ON | OFF | OFF |

A charger such as a turbo charger 32 or super charger is installed in an intake air passage 30 of the engine 10. A charge pressure generated in the super charger 32 is supplied to each of the engine cylinders. A relief valve 34 is installed as an intake air quantity varying means in the intake air passage 30 downstream of the super charger 32. When the relief valve 34 is controlled in the open-and-close mode, a charge pressure supplied to each cylinder, i.e., a charging efficiency of air into the cylinder, is controlled.

An engine control unit 36 for governing the engine is attached to the engine 10, the engine control unit 36 providing an ignition timing control signal for the engine 10 and providing an open-and-close control signal for the relief valve 34.

The engine control unit 36 functionally includes gear changing point detecting means 38 for detecting a gear range changing point from a signal introduced as an ON or OFF signal to the first, second, and third shift solenoids 16, 18, and 20 from the A/T control unit 22.

Figure 2:
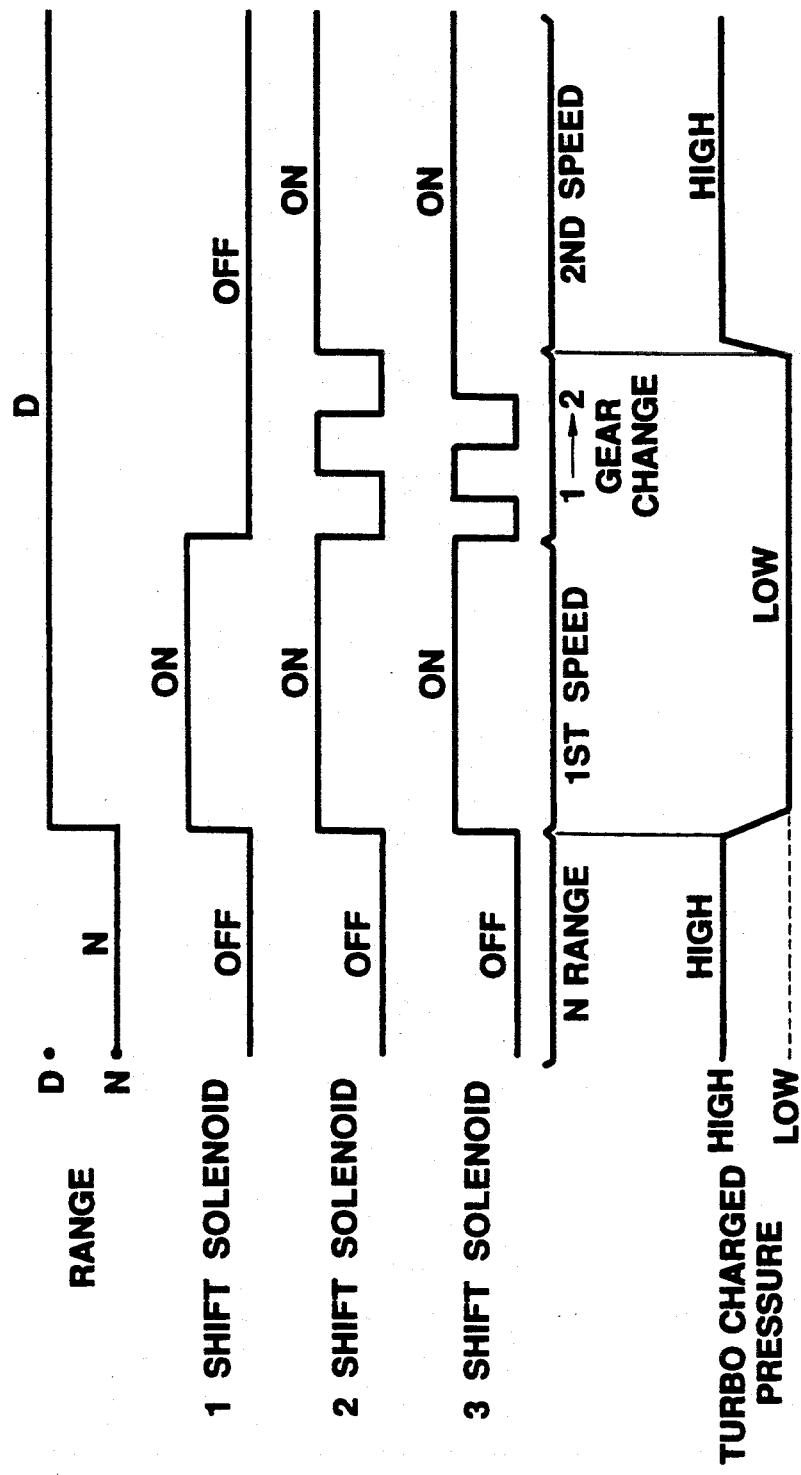
FIG. 2 is a timing chart showing each element of the vehicle speed controlling system shown in FIG. 1.

The gear changing point detecting means 38, at first, detects OFF signals of the first, second, and third shift solenoids 16, 18, and 20, when, as shown in FIG. 2, the gear range changing means detects the change from N (Neutral) range to D (Drive) range from a range signal, and then detects the first speed range (as appreciated from Table II) when each shift solenoid 16, 18, and 20 receives the ON signal. From thereon each gear range change is detected according to the Table II.

The second shift solenoid 18 and third shift solenoid 20 are on-and-off controlled within a short period of time at a gear change transient time in which the first, low speed gear range is transferred to the second, higher speed gear range and thus smoothly changes the change pressure generated by the second and third shift solenoids 18, 20, thus providing a slight slip on the corresponding frictional element to prevent a gear change shock.

In the preferred embodiment, the charge pressure caused by the turbo charger 32 is set to a lower value at the gear change transient time in which the gear range is transferred from the first speed range to the second speed range, as shown in FIG. 2.

It is noted that the turbo charge pressure can be set to a lower value even in the N range as denoted by a broken line in FIG. 2.

A timer 40 is provided in the engine control unit 36 for controlling the gear changing point detecting means 38 to detect the changeover signal, indicating the change from the first speed to the second speed, so that the gear change transient is detected with a time delay.

Figure 3:
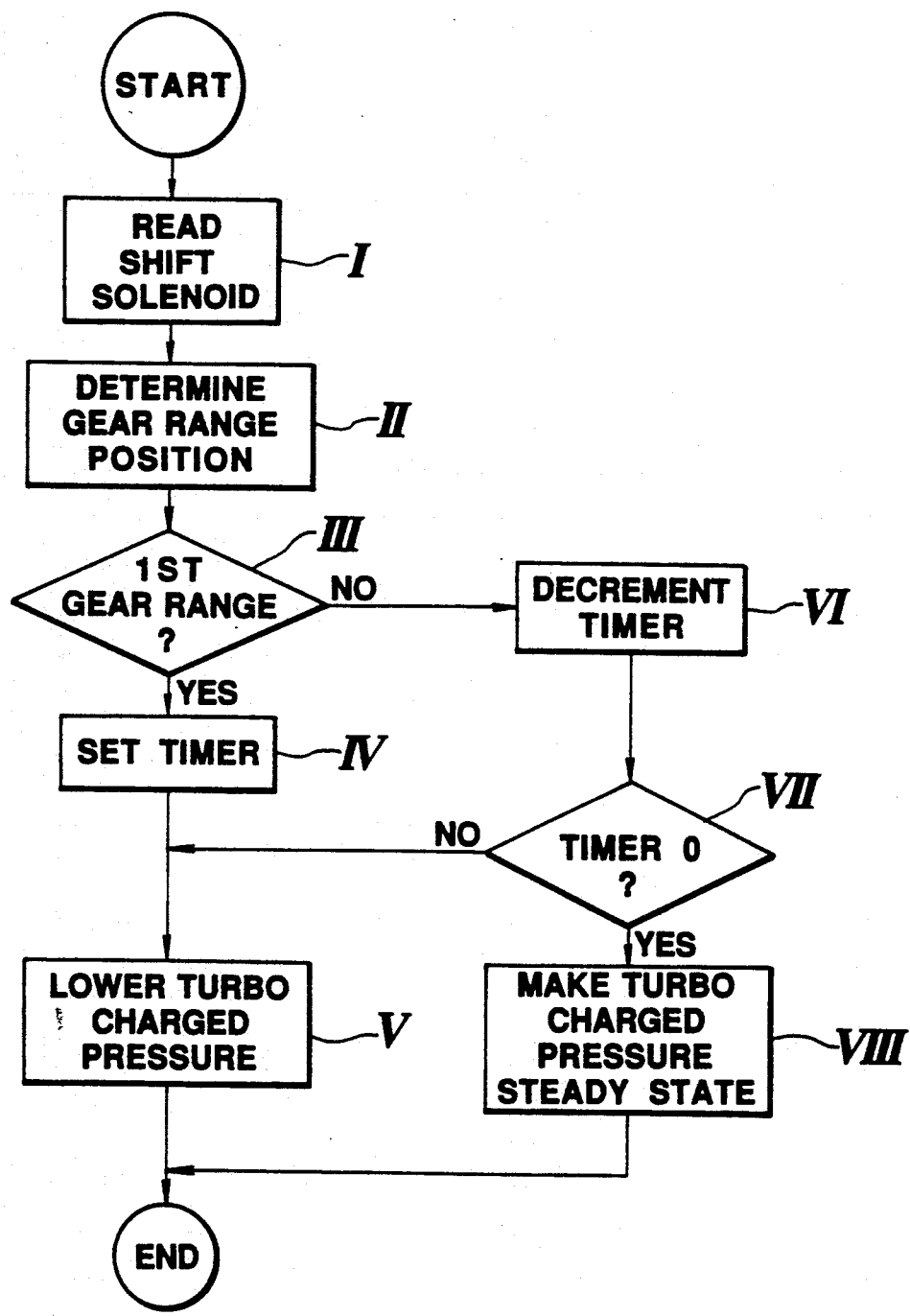
FIG. 3 is an operational flowchart executed by a control unit of the vehicle speed controlling system shown in FIG. 1.

FIG. 3 shows an operational flowchart for explaining the operation of the vehicle speed controlling system in the preferred embodiment described above.

The operational flowchart shown in FIG. 3 is repeatedly executed by the engine control unit 36 at each predetermined period of time.

In a step I, the engine control unit 36 reads the drive signal contents from the driven states of the first, second, and third shift solenoids 16, 18, and 20. In a step II, the control unit 36 determines the gear shift range position from the ON and OFF drive signals of the first, second, and third shift solenoids 16, 18, and 20.

In a step III, the control unit 36 determines whether the gear shift range position is in the first speed range.

If YES (first gear range), the routine goes to a step IV in which the timer 40 (which counts a predetermined time) is set. Thereafter, in a step V, the turbo charged pressure is reduced.

Since the set time of the timer 40 corresponds to a transient time required for a gear change in the vehicle speed controlling system of the preferred embodiment, recovery of the charged pressure by means of the turbo charger 32 can be assured after the second speed range is set and resumption of the higher turbo charged pressure midway through the gear change transient time can be prevented.

On the other hand, in a subsequent cycle of program execution, after the vehicle is in motion, if NO is determined, at the step III, the routine goes to a step VI in which the timer 40, set in the step IV is decremented for each execution of the flowchart shown in FIG. 3 and the routine goes to a step VII in which the control unit determines whether the timer indicates zero.

If the timer indicates zero (YES) in the step VII, the routine goes to a step VIII in which the turbo charged pressure reduced in the step V is recovered and increased to a steady state. If the timer does not indicate zero (NO) in the step VII, the routine goes to the step V to continue reduction of the turbo charged pressure.

It will be noted that, since operation of the automatic transmission does not allow gear shifting from N directly to the second gear range, when a vehicle initially begins to move the control program will proceed from steps I to V. Steps VI and VIII engage only after the vehicle is in motion on subsequent cycles of program execution.

In the previously proposed vehicle speed controlling system, misfiring occurs due to increase of internal pressure in each or any cylinder due to resumption of a higher turbo charged pressure midway through the gear change transient period, e.g., in a case such as when the engine output is reduced during retardation of the ignition timing in the gear change transient time.

On the other hand, in the preferred embodiment of the invention, resumption of turbo charged pressure is carried out after completion of the gear transient period at which time the ignition timing is recovered. Therefore, the engine 10 does not run erratically due to misfire and smooth gear changing becomes possible.

Although, in the preferred embodiment, the turbo charger 32 is equipped with the engine 10, the present invention is applicable to an engine in which no turbo charger is mounted. In this case, the intake air quantity varying means must be mounted in place of the relief valve 34.

In a case where the air charging efficiency is reduced in the gear change transient period by means of the intake air quantity varying means, the present invention is applicable so that no shock occurs due to change of the gear shift position and smooth gear changing can be achieved.

Although, in the preferred embodiment, the present invention is applied to an automatic transmission having a main transmission and a sub transmission so that five forward gear speeds can be achieved, the present invention is applicable to automatic transmissions having four forward speeds as disclosed in the Japanese Patent Application First Publication No Showa 62-62047.

As described hereinabove, in the vehicle speed controlling system and method according to the present invention, the engine air charging efficiency is set to a relatively lower value at the time of a gear change transient period from a low speed gear range to a higher speed gear range in response to a gear change signal detected with a predetermined time delay via a delay means (timer), the predetermined delay of time corresponding to the time required for the gear change transient period, resumption of the air charging efficiency can be smoothly carried out after the gear range is set to the higher gear range position. Hence, in a case where control to reduce the engine output in the gear change transient period is carried out, prevention from resumption increasing the air charging efficiency in the gear change transient period can be assured. Thus, it is possible to prevent increase in the internal pressure due to the retardation of the ignition timing and the engine operates smoothly at the time of the gear change. This, together with the reduction of shock generated when the frictional elements are engaged due to the ON and OFF control of the solenoid valves in a short period of time, insures that engine output is smoothly controlled. Consequently, shock generated when gear change occurs in an automatic transmission can remarkably reduced and riding comfort of the vehicle can remarkably improved.

It will fully be appreciated by those skilled in the art that the foregoing description has been made in terms of the preferred embodiment and various changes and modifications may be made without departing from the scope of the present invention which is to be defined by the appended claims.

What is claimed is:

1. A system for controlling gear shifting characteristics to prevent a gear shift shock in a vehicle equipped with an engine and an engine driven automatic transmission means, comprising:
   (a) an automatic transmission means having:
   a plurality of frictional elements, combinations of engagements and releases thereof for shifting gears of said automatic transmission;
   a plurality of shift valves which respectively engages and releases said frictional elements to cause shifting of the gears;
   a plurality of solenoid valves installed individually on the respective shift valves for controlling pressure of the shift valves associated therewith, at least one of the solenoid valves being switched on during the gear shifting transient period in response to a drive signal; and
   means for detecting vehicle running conditions and providing said drive signal according to the detected running conditions,
   (b) an engine having:
   relief means for relieving the intake air pressure supplied to the engine,
   (c) a shift control means comprising:
   means for detecting a gear shift in said automatic transmission from a low gear to a next higher gear,
   means for providing a predetermined time delay upon detection of said gear shift and for producing a delay completion signal upon the lapse of said predetermined delay, and
   means for controlling said relief means to vary the intake air pressure supplied to the engine and additionally for lowering the air charging efficiency in response to detection of the gear shift for the duration of the gear shifting transient period and additionally for increasing the air charging efficiency in response to the delay completion signal.

2. A system as set forth in claim 1, wherein said automatic transmission includes a main transmission which has four forward gears and a sub transmission which has an additional fifth forward gear, both said main transmission and said sub transmission being arranged in series to provide five forward gears in said automatic transmission.

3. A system as set forth in claim 2, wherein said automatic transmission includes first and second shift valves for switching the gears of the main transmission and a third shift valve for switching the fifth gear of the sub-transmission; first, second, and third shift solenoids on said first, second, and third shift valves, respectively, said first, second, and third shift valves being switched in combination to select a desired gear upon pressure change generated when the corresponding shift solenoids are driven in response to an ON signal, the combination of ON and OFF signals supplied to said first, second, and third shift solenoids selecting the following gear:

| Gearing | 1st Shift Solenoid | 2nd Shift Solenoid | 3rd Shift Solenoid |
|---|---|---|---|
| 1st Gear | ON | ON | ON |
| 2nd Gear | OFF | ON | ON |
| 3rd Gear | OFF | OFF | ON |
| 4th Gear | OFF | OFF | OFF |
| 5th Gear | ON | OFF | OFF |

4. A system as set forth in claim 3, wherein said engine includes an additional air charging means operatively situated in an intake air passage thereof so that additional air charging pressure is supplied to the engine, and wherein said relief means comprises a relief valve operatively situated downstream of said additional air charging means to control the air charging efficiency of the engine.

5. A system as set forth in claim 4, wherein said detecting means detects a gear shift from the combination of ON and OFF signals supplied to said first, second, and third shift solenoids.

6. A system as set forth in claim 5, wherein the second shift solenoid valve and the third shift solenoid valve are modulated in response to repetitive ON and OFF signals within the gear shift transient time during the first gear to the second gear shift so that the pressure change generated by said second and third shift solenoid valves is changed gradually to provide a slight slip for the corresponding frictional elements, thus preventing a shift shock from being generated during said first gear to said second gear shift.

7. A system as set forth in claim 6, wherein said predetermined delay is a time duration required for the gears to up shift from a lower gear to a next higher gear.

8. A system as set forth in claim 7, wherein said predetermined time delay providing means comprises a preset timer which provides the signal to the relief means controlling means upon the lapse of said preset delay.

9. A system as set forth in claim 1, further including means for retarding the engine ignition timing during the gear shifting transient time.

10. A gear shift controlling apparatus for a vehicle equipped with an engine and an engine driven automatic transmission, comprising:
    air charging efficiency determining means;
    intake air quantity varying means for varying the intake air pressure;
    detecting means for detecting a gear shift in the automatic transmission from a low gear to a next higher gear; and
    delay means for providing a predetermined delay upon detection of the gear shift from said low gear to said higher gear and for producing a delay completion signal upon the lapse of said predetermined delay,
    wherein said air charging efficiency determining means sets the air charging efficiency to a lower efficiency value by lowering the intake air pressure when said detecting means detects said gear shift from said low gear to said higher gear, and
    wherein said air charging efficiency determining means sets the air charging efficiency to a higher efficiency value by increasing the intake air pressure in response to the delay completion signal indicative of the lapse of said predetermined delay to recover to a normal air charging efficiency.

11. A gear shift controlling apparatus as set forth in claim 10, wherein said predetermined delay is a time duration required for a complete up shift from a low gear to a next higher gear.

12. A gear shift controlling apparatus as set forth in claim 11, wherein an ignition timing of the engine is retarded to reduce the engine output upon said gear shift detection by said detecting means.

13. A method for controlling gear changing characteristics to prevent shift shock in a vehicle equipped with an engine and an engine driven automatic transmission, wherein the automatic transmission comprises:
- a plurality of frictional elements, combinations of engagements and releases thereof for shifting gears of said automatic transmission;
- a plurality of shift valves which respectively engages and releases the frictional elements to cause shifting of the gears;
- a plurality of solenoid valve installed individually on the respective shift valves for controlling pressure of the shift valves associated therewith, at least one of the solenoid valves being switched on during the gear shifting transient period in response to a drive signal; and means for detecting vehicle running conditions and providing the drive signal according to the detected running conditions, wherein the engine includes:

means for controlling air charging efficiency by varying the intake air pressure supplied to the engine, and the method comprising the steps of:
 (a) detecting a gear shift in said automatic transmission from a low gear to a next higher gear;
 (b) lowering the air charging efficiency during said gear shifting transient period from said low gear to said higher gear;
 (c) providing a predetermined time delay upon detection of said gear shift from said low gear to said higher gear;
 (d) producing a delay completion signal upon the lapse of said predetermined delay; and
 (e) increasing and recovering the air charging efficiency in response to the delay completion signal.

* * * * *